US008427520B2

(12) United States Patent
Rosenberg et al.

(10) Patent No.: US 8,427,520 B2

(45) Date of Patent: Apr. 23, 2013

(54) REMOVING A SELF IMAGE FROM A CONTINUOUS PRESENCE VIDEO IMAGE

(75) Inventors: Yaakov Moshe Rosenberg, Tel Aviv (IL); Eyal Leviav, Tel Aviv (IL)

(73) Assignee: Polycom, Inc., San Jose, CA (US)

( * ) Notice: Subject to any disclaimer, the term of this patent is extended or adjusted under 35 U.S.C. 154(b) by 270 days.

(21) Appl. No.: 12/958,500

(22) Filed: Dec. 2, 2010

(65) Prior Publication Data

US 2012/0140020 A1 Jun. 7, 2012

(51) Int. Cl.
*H04N 7/14* (2006.01)

(52) U.S. Cl.
USPC .................. 348/14.07; 348/14.09; 348/14.08

(58) Field of Classification Search .... 348/14.01–14.16; 370/260–261; 709/204; 715/753
See application file for complete search history.

(56) References Cited

U.S. PATENT DOCUMENTS

2008/0030621 A1* 2/2008 Ciudad et al. ................ 348/586
2008/0316298 A1* 12/2008 King et al. ................. 348/14.09
2009/0009587 A1* 1/2009 Lindbergh ................. 348/14.08
2009/0225153 A1* 9/2009 Shibuya et al. ........... 348/14.13
2011/0090301 A1* 4/2011 Aaron et al. .............. 348/14.08

* cited by examiner

*Primary Examiner* — Melur Ramakrishnaiah

(74) *Attorney, Agent, or Firm* — Wong, Cabello, Lutsch, Rutherford & Brucceleri, LLP

(57) ABSTRACT

Upon receiving a continuous presence video image, an endpoint of a videoconference may identify its self image and replace the self image with other video data, including an alternate video image from another endpoint or a background color. Embedded markers may be placed in a continuous presence video image corresponding to the endpoint. The embedded markers identify the location of the self image of the endpoint in the continuous presence video image. The embedded markers may be inserted by the endpoint or a multipoint control unit serving the endpoint.

20 Claims, 8 Drawing Sheets

COMPRESSED VIDEO TOWARD THE MCU
COMPRESSED CP IMAGE FROM THE MCU
400
430 VIDEO ENCODER
450 EIM CONTROLLER
EVP VIDEO DECODER 460
470
CONTROL
475 BACKGROUND FM
EIM ANALYZER & SELF IMAGE REMOVER
EIM EMBEDDER AND FM
EIM FM
410
420
EVP CP FRAME MEMORY MODULE 490
ENDPOINT VIDEO PROCESSOR (EVP)
VIDEO IMAGE FROM THE EP CAMERA
DECODED CP IMAGE TO EP DISPLAY
VIDEO LINKS
CONTROL LINKS

REMOVING A SELF IMAGE FROM A CONTINUOUS PRESENCE VIDEO IMAGE

TECHNICAL FIELD

The present invention relates to the field of videoconferencing systems, and in particular to continuous presence (CP) videoconferencing systems.

BACKGROUND ART

Videoconferencing enables individuals located remote from each other to have face-to-face meetings on short notice using audio and video telecommunications. A videoconference may involve as few as two sites (point-to-point) or several sites (multi-point). A single participant may be located at a conferencing site or there may be several participants at a site, such as at a conference room. Videoconferencing may also be used to share documents, information, and the like.

Participants in a videoconference interact with participants at other sites via a videoconferencing endpoint (EP). An endpoint is a terminal on a network, capable of providing real-time, two-way audio/visual/data communication with other terminals or with a multipoint control unit (MCU, discussed in more detail below). An endpoint may provide speech only, speech and video, or speech, data and video communications, etc. A videoconferencing endpoint typically comprises a display unit on which video images from one or more remote sites may be displayed. Example endpoints include POLYCOM® VSX® and HDX® series, each available from Polycom, Inc. (POLYCOM, VSX, and HDX are registered trademarks of Polycom, Inc.). The videoconferencing endpoint sends audio, video, and/or data from a local site to the remote site(s) and displays video and/or data received from the remote site(s) on a screen.

Video images displayed on a screen at a videoconferencing endpoint may be arranged in a layout. The layout may include one or more segments for displaying video images. A segment is a portion of the screen of a receiving endpoint that is allocated to a video image received from one of the sites participating in the session. For example, in a videoconference between two participants, a segment may cover the entire display area of the screen of the local endpoint. Another example is a video conference between a local site and multiple remote sites where the videoconference is conducted in switching mode, such that video from only one other remote site is displayed at the local site at a single time and the displayed remote site may be switched, depending on the dynamics of the conference. In contrast, in a continuous presence (CP) conference, a conferee at a terminal may simultaneously observe several other participants' sites in the conference. Each site may be displayed in a different segment of the layout, where each segment may be the same size or a different size. The choice of the sites displayed and associated with the segments of the layout may vary among different conferees that participate in the same session. In a continuous presence (CP) layout, a received video image from a site may be scaled or cropped in order to fit a segment size.

An MCU may be used to manage a videoconference. Some MCUs are composed of two logical units: a media controller (MC) and a media processor (MP). A more thorough definition of an endpoint and an MCU may be found in the International Telecommunication Union ("ITU") standards, including the H.320, H.324, and H.323 standards. Additional information regarding the ITU standards may be found at the ITU website www.itu.int.

To present a video image within a segment of a screen layout of a receiving endpoint, the entire received video image may be manipulated by the MCU, including scaling or cropping the video image. An MCU may crop lines or columns from one or more edges of a received conferee video image in order to fit it to the area of a segment in the layout of the videoconferencing image. Another cropping technique may crop the edges of the received image according to a region of interest in the image, as disclosed in U.S. patent application Ser. No. 11/751,558, the entire contents of which are incorporated herein by reference.

In a videoconferencing session, the size of a segment in a layout may be defined according to a layout selected for the session. For example, in a 2×2 layout each segment may be substantially a quarter of the display. In a 2×2 layout, if five sites are taking part in a session, conferees at each site typically may see the other four sites.

In a CP videoconferencing session, the association between sites and segments may be dynamically changed according to the activity taking part in the conference. In some layouts, one of the segments may be allocated to a current speaker, and other segments may be allocated to other sites, sites that were selected as presented conferees. The current speaker is typically selected according to certain criteria, such as having the highest audio signal strength during a certain percentage of a monitoring period. The other sites (in the other segments) may include the image of the conferee that was the previous speaker, sites with audio energy above a certain threshold, certain conferees required by management decisions to be visible, etc.

In some cases a plurality of sites may receive a similar layout from an MCU. Sites that are not presented may receive one of the layouts that are sent toward one of the presented conferees, for example. In a conventional CP conference, each layout is associated with an output port of an MCU, for example.

A typical output port may comprise a CP image builder and an encoder. A typical CP image builder may obtain decoded video images from each one of the presented sites. The CP image builder may scale and/or crop the decoded video images to a required size of a segment in which each image will be presented. The CP image builder may further write the scaled image in a CP frame memory in a location that is associated with the location of the segment in the layout. When the CP frame memory is completed with all the presented images located in their associated segments, then the CP image may be read from the CP frame memory by the encoder.

The encoder may encode the CP image. The encoded and/or compressed CP video image may be sent toward the endpoint of the relevant conferee. A frame memory module may employ two or more frame memories, for example, a currently encoded frame memory and a next frame memory. The frame memory module may alternately store and output video of consecutive frames. Output ports of an MCU are well known in the art and are described in a numerous patents and patent applications, including U.S. Pat. No. 6,300,973, the content of which is incorporated herein by reference in its entirety for all purposes.

An output port typically consumes substantial computational resources, especially when the output port is associated with a high definition (HD) endpoint that displays high-resolution video images at a high frame rate. In typical MCUs, the resources needed for the output ports may limit the capacity of the MCU and have a significant influence on the cost of a typical MCU.

In order to solve the capacity/cost issue, some conventional MCUs offer a conference on port (COP) option, in which a single output port is allocated to a CP conference. In a conference on port MCU, all of the sites that participate in the session receive the same CP video image.

SUMMARY OF INVENTION

In some video conference layouts a conferee sees the conferee's self image (the video image sent from the conferee's endpoint, thus a video echo) in a CP image. For example, in a videoconference session in which a COP option is used, a presented conferee sees the conferee's self image in one of the segments. Some users prefer not to see their self image in a CP video image. Some of those users complain that seeing themselves confuses them and decreases their videoconference experience.

The above-described deficiencies in videoconferencing do not limit the scope of the inventive concepts of the present disclosure in any manner. The deficiencies are presented for illustration only.

Embodiments of the present disclosure provide novel systems and methods that may be implemented in a videoconference system for handling a CP videoconference in an efficient manner without damaging the experience of the conferees.

Disclosed embodiments provide novel systems and methods for manipulating a CP video image. The manipulation comprises removing from a CP video image the video image of a conferee observing the CP video image. In some embodiments, manipulation of the CP video image may be done at the receiving endpoint. In other embodiments, the manipulation may be done before transmitting the CP video image toward the endpoint.

In some embodiments, the entire process may be implemented in an endpoint and be transparent to an MCU that controls the videoconference. In such embodiments, the endpoint may add markers to the video images that it generates, which may be embedded invisible markers (EIM) that may be embedded in the video image that is generated at the endpoint. The EIM may be sent as part of the video image toward an MCU.

The EIM may be handled by the MCU as conventional video data received from the endpoint. Accordingly, the EIM may be handled similar to the video image. For example, the EIM may be scaled and cropped together with the video image in which it is embedded. The endpoint video image with the EIM may be placed in a CP video image. The CP video image with the embedded EIM may be sent to one or more endpoints, including the endpoint that sent the video image.

The endpoint may be further configured to decode the received CP video image and search the video data looking for the EIM. In some embodiments, if EIM are found then the EIM may be analyzed to determine whether the EIM were generated by the endpoint itself. If they were, then the CP video segment associated with that EIM may be marked as the self image of the receiving endpoint, for example. The video data in that marked segment may be replaced with other video data, including background color.

EIM may also include data that can enable identifying the endpoint that generated the EIM. A plurality of type of identification data (ID) may be used, including a combination of video data values in Red Green Blue (RGB) coordinates, values of the three video components YUV (the Y component reflects the brightness, and the other two components U and V reflect the chrominance of the pixel), a combination of the above, etc.

Other type of data carried by EIM may help define geometrical parameters of the relevant video image. The geometrical parameters may be used to overcome the manipulation by the MCU of the original video image, which was generated and sent by that endpoint, to place that image in the CP video image. The MCU manipulations can include scaling and cropping, etc.

In one embodiment, the EIM may be two lines in a cross shape, such as a vertical line and a horizontal line located at the middle of the generated image or elsewhere. The EIM may be embedded in the video image that is created and sent by the endpoint. The lines may carry ID that are associated with that endpoint. The ID may be color data, for example. Each line may be divided into a plurality of sections. The number and placement of the EIM lines is illustrative and by way of example only, and other numbers and placement of EIM lines may be used.

Each section may have a pre-defined number of pixels. Thus, the number of sections in each line may reflect the size of the image in pixels in the direction of the line. Thus, the number of sections in a horizontal line may be used to determine the horizontal size of the image, while the number of sections in a vertical line may be used to determine the vertical size of the image. By processing the number of sections in each line of the cross in the received CP video image and the location of center of the cross in the CP video image, the receiving endpoint may find the exact location of its own video image in the CP video image. The receiving endpoint may delete the identified video image from the CP video image, replacing it with other data. The EIM preferably preserve their ID through the different manipulations, including encoding in the endpoint, decoding, scaling and encoding in the MCU, decoding in the endpoint, etc.

Other embodiments may use other types of EIM. In some embodiments, a plurality of lines, forming a net, may be used to deliver geometrical data on the video image in a received CP video image. In other embodiments, a type of barcode modulation may be used as ID for the endpoint, etc. Other embodiments may use a horizontal line running from the left edge to the right edge of the image and a vertical line running from the top to the bottom of the image. The lines may be added by the endpoint and may use color codes that reflect the endpoint's ID. In alternate embodiments, two lines may be added, one from left to right and the other from top to bottom, but with an angle between them. The angle may be used to reflect the endpoint's ID, for example.

Some embodiments of an endpoint may add the EIM to a single frame every few frames, for example, 5-100 frames of its generated video image. Other embodiments may adapt the interval between adding the EIM according to changes in the endpoint situation. For example, the endpoint may be configured to monitor the audio energy that it transmits. Upon determining an increasing of the audio energy for a certain period of time, the endpoint may reduce the number of frames between adding the EIM. After a while, the number of frames between transmitting of EIM may be increased, etc. In some embodiments, a plurality of indications of a change in the audio mix may be followed by adding the EIM to the next video frame.

In some embodiments, an endpoint may search for EIM in received frames of CP video image during a window of a certain number of consecutive frames after transmitting a frame with EIM by that endpoint. In other embodiments, an endpoint may be configured to learn the delay, in frames or milliseconds, between transmitting a frame with EIM and receiving a CP video image that includes that frame. Such embodiments may adapt the size of the searching window (the number of frames of CP video images) and the delay of the searching window from the time of transmitting by the endpoint of a frame with EIM.

Other endpoints may, instead or in addition to using EIM, be adapted to search for a segment in a received CP video image that has high correlation with a frame of video image that was generated by the endpoint and was sent to the MCU previously.

Other embodiments may require cooperation between an MCU and an endpoint. In such embodiments an MCU may be configured to signal a presented conferee's endpoint that its generated video image is embedded in a CP video image that is or will be sent to that endpoint. In addition, the location of its video image in the CP video image may be included in the signaling. The location may be defined in number of pixels from the top left point of the CP video image, in both axis W×H, and the number of pixels in each axis of the relevant video image in the CP video image, for example.

In some embodiments, the signaling may be sent out of band. In one embodiment, out of band connections may be over an Internet Protocol (IP) connection that is set between the MCU and the endpoint. In other embodiments, the signaling may be carried in band, in one of the accessory headers of the Real-time Transport Protocol (RTP), for example. Based on the signaling received from the MCU, an endpoint may identify the location of the local conferee's image in the received CP video image and may replace the video data with other data.

Other embodiments may use the slice mode for replacing a self image with other data. In a slice mode, each segment of a CP video layout may be defined as a slice, for example. A receiving endpoint may replace Network Abstraction Layer (NAL) data in one or more relevant slices with other data. Alternatively, a network interface of an MCU may be adapted to replace the data in the relevant NALs that carry that slice with other video data and send it toward the endpoint. In such embodiments, the MCU may be adapted to arrange the NALs of a CP video image so that each NAL includes video data from a single endpoint.

In another embodiment, a conferee may control the endpoint by using a remote control unit. The conferee may mark the borders of the segment assigned to the conferee's self image. The conferee may instruct the endpoint to replace the video data in the marked segment with a replacement video data such as uniform color, for example.

In some embodiments, a self image may be replaced with a background color, a logo of the company, a slide, etc. In other embodiments, the MCU may send an extra segment. The extra segment may be sent as a second video stream using communication standards, such as ITU standard H.239. An endpoint may replace its self image with the video data of the extra segment and see other conferees instead of seeing the local conferee.

These and other aspects of the disclosure will be apparent in view of the attached figures and detailed description. The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation. Software may be embodied on a computer readable medium such as a read/write hard disc, CDROM, Flash memory, ROM, etc. In order to execute a certain task, a software program may be loaded to an appropriate processor as needed.

For purposes of this disclosure, the terms "endpoint," "terminal," and "site" are used interchangeably. For purposes of this disclosure, the terms "participant," "conferee," and "user" are used interchangeably.

Figure 1:
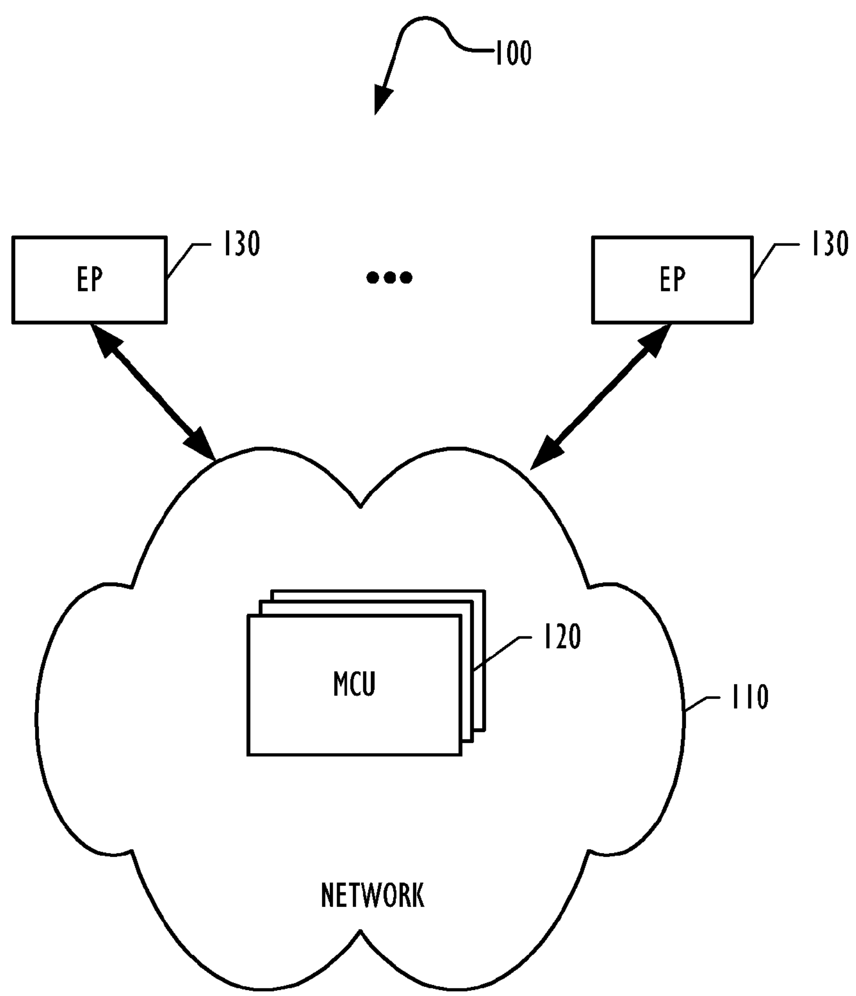
FIG. 1 is a block diagram illustrating relevant elements of a multimedia multipoint videoconferencing system according to various embodiments.

FIG. 1 is a block diagram with relevant elements of a multimedia multipoint videoconferencing system 100 according to one embodiment. System 100 may include a network 110, one or more MCUs 120, and a plurality of endpoints 130.

In some embodiments, network 110 may include a load balancer (not shown in the drawings). The load balancer may be capable of controlling the plurality of MCUs 120. This may promote efficient use of all of the MCUs 120 because they are controlled and scheduled from a single point. Additionally, by combining the MCUs 120 and controlling them from a single point, the probability of successfully scheduling an impromptu videoconference is greatly increased. An example load balancer is the Polycom DMA® 7000. (DMA is a registered trademark of Polycom, Inc.) More information on exemplary load balancer can be found in U.S. Pat. No. 7,174,365, which is hereby incorporated by reference, in its entirety for all purposes, as if fully set forth herein.

The plurality of endpoints (EP) 130 may be connected via the network 110 to the one or more MCUs 120. In embodiments in which a load balancer exists, then the endpoints (EP) 130 may communicate with the load balancer before being connected to one of the MCUs.

The MCU 120 is a conference controlling entity. In one embodiment, the MCU 120 may be located in a node of the network 110, in a terminal, or elsewhere. The MCU 120 receives several media channels from endpoints 130 through access ports according to certain criteria, processes audiovisual signals, and distributes them to connected channels. Examples of an MCU 120 include the MGC-100 and RMX® 2000, available from Polycom, Inc. (RMX 2000 is a registered trademark of Polycom, Inc.) An MCU 120 may be an IP MCU, which is a server connected to an IP network. An IP MCU 120 is only one of many different network servers that may implement the teachings of the present disclosure. Therefore, the present invention is not limited to IP MCUs.

The network 110 may be a single network or a combination of two or more networks, including an Integrated Services Digital Network (ISDN), the Public Switched Telephone Network (PSTN), an Asynchronous Transfer Mode (ATM) network, the Internet, a circuit switched network, an intranet, etc. The multimedia communication over the network may be based on communication protocols, including H.320, H.323, H.324, Session Initiation Protocol (SIP), etc. More information about communication protocols can be obtained from the International Telecommunication Union (ITU). More information on SIP can be obtained from the Internet Engineering Task Force (IETF).

An endpoint 130 may comprise a user control device (not shown). The user control device may act as an interface between a user of the EP 130 and the MCU 120, for example. User control devices may include a dialing keyboard (the keypad of a telephone, for example) that uses Dual Tone Multi Frequency (DTMF) signals, a dedicated control device that may use other control signals instead of or in addition to DTMF signals, a far end camera control signaling module according to standards H.224 and H.281, etc.

An endpoint 130 may also comprise a microphone (not shown in the drawing) to allow users at the endpoint 130 to speak within the conference or contribute to the sounds and noises heard by other users, a camera to allow the endpoint 130 to input live video data to the conference; one or more loudspeakers to enable hearing the conference, and a display to enable the conference to be viewed at the endpoint 130. Endpoints 130 missing one of the above components may be used, but may be limited in the ways in which they can participate in the conference.

The portion of the system 100 illustrated in FIG. 1 comprises and describes only the relevant elements for purposes of simplicity of understanding. Other sections of the system 100 are not described. It will be appreciated by those skilled in the art, that depending upon its configuration and the needs of the system, system 100 may have other number of endpoints 130, networks 110, load balancers, MCUs 120, and other elements. More information on the MCU 120 and endpoint 130 is disclosed below in conjunction with FIGS. 2-7.

Figure 2:
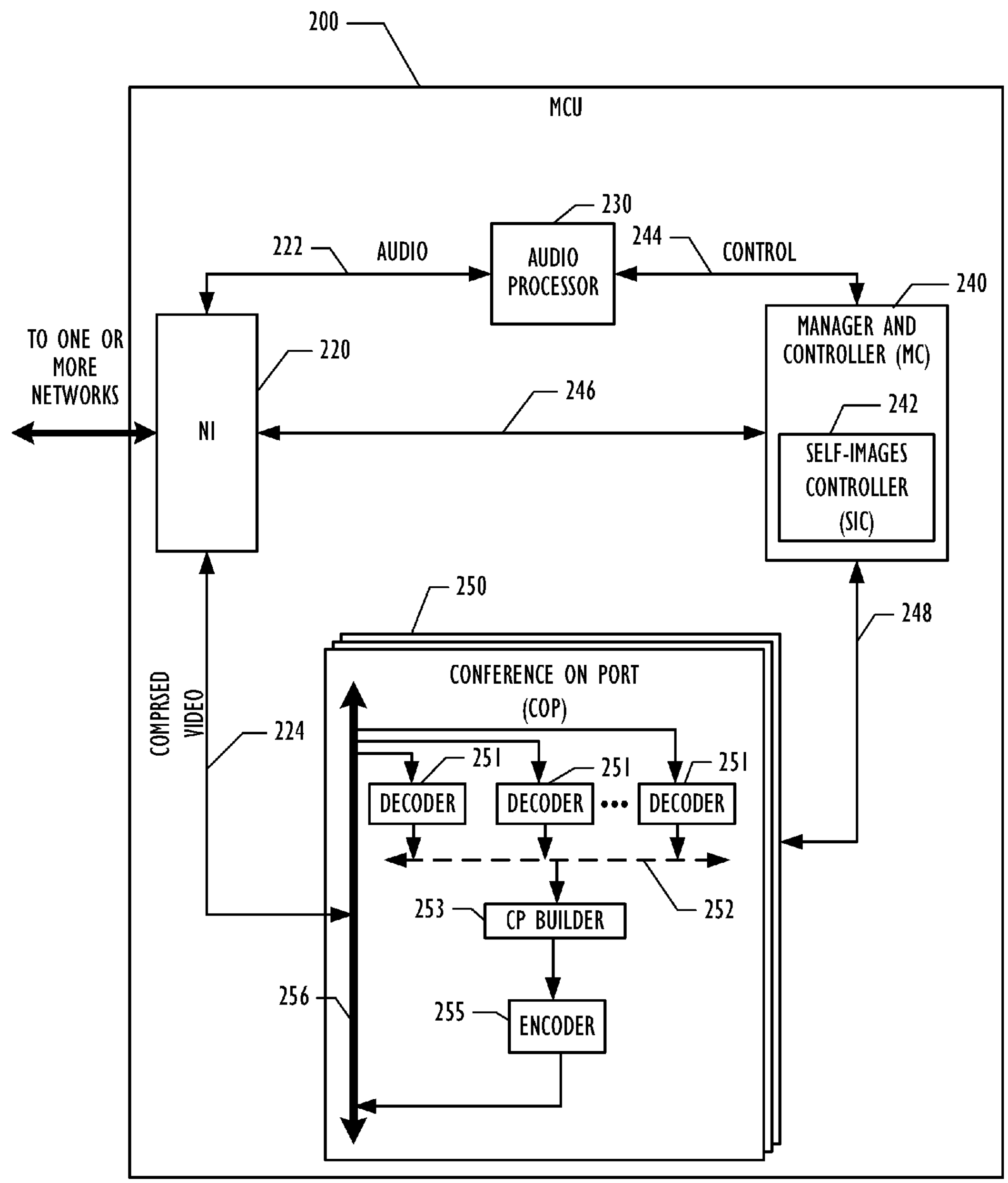
FIG. 2 is a block diagram illustrating relevant elements of a portion of an MCU according to one embodiment.

FIG. 2 is a block diagram with relevant elements of an exemplary portion of an MCU 200, according to one embodiment. Alternative embodiments of an MCU 200 may have other components and/or may not include all of the components shown in FIG. 2.

The MCU 200 may comprise a Network Interface (NI) 220. The Network Interface (NI) 220 may act as an interface between the plurality of endpoints 130 and the internal modules of the MCU 200. The NI 220 may receive multimedia communication from the plurality of endpoints 130 via the network 110, for example. The NI 220 may process the received multimedia communication according to communication standards, including H.320, H.321, H.323, H.324, and SIP.

The NI 220 may deliver compressed audio, compressed video, data, and control streams, processed from the received multimedia communication, toward the appropriate internal modules of the MCU 200. Some communication standards require that the NI 220 include de-multiplexing the incoming multimedia communication into compressed audio, compressed video, data, and control streams.

The NI 220 may also transfer multimedia communication from the internal modules of the MCU 200 toward one or more endpoints 130 via network 110. NI 220 may receive separate streams from the various internal modules of the MCU 200. The NI 220 may multiplex and process the streams into multimedia communication streams according to one of the communication standards, including H.323, H.324, SIP, etc. NI 220 may transfer the multimedia communication toward the network 110, which can carry the streams toward one or more endpoints 130.

More information about communication between endpoints 130 and MCUs 200 over different networks 110, and information describing signaling, control, and how to set a video call, for example, can be found in the International Telecommunication Union ("ITU") standards H.320, H.321, H.323, or the IETF documentation for SIP, for example.

The MCU 200 may also comprise an audio processor 230. The audio processor 230 may receive, via the NI 220 and through an audio link 222, compressed audio streams from the plurality of endpoints 130. The audio processor 230 may process the received compressed audio streams, may decompress and/or decode and mix relevant audio streams, encode and/or compress them, and may transfer the compressed encoded mixed signal via the audio link 222 and the NI 220, toward the relevant endpoints 130.

In one embodiment, the audio streams that are sent toward each of the relevant endpoints 130 may be different, according to the needs of each individual endpoint 130. For example the audio streams may be formatted according to a different communications standard for each endpoint 130. Furthermore, in some embodiments, an audio stream sent to an endpoint 130 may not include the voice of a user associated with that endpoint 130, while that user's voice may be included in all other mixed audio streams sent to the other endpoints 130.

In one embodiment, the audio processor 230 may include at least one DTMF module (not shown in the drawing), which may detect and extract DTMF signals from the received audio streams. The DTMF module may convert DTMF signals into DTMF control data, which may be forwarded via a control link 244 to a Manager and Controller (MC) 240.

The control data may be used to control features of the conference. The control data may include commands sent by a conferee at an endpoint 130 via a click and view function, for example. Some click and view methods are used for controlling the MCU 200 via DTMF signals carried over the audio signal received from an endpoint. A reader who wishes to learn more about the click and view function is invited to read the U.S. Pat. No. 7,542,068, the content of which is incorporated herein by reference in its entirety for all purposes.

In other embodiments, a speech recognition technique may be used for controlling the MCU 200. In such embodiments, a speech recognition module (not shown) may be included in audio processor 230 in addition to, or instead of, the DTMF module. In such embodiments, the speech recognition module may convert the vocal commands and user's responses into control signals for controlling the videoconference.

Further embodiments may use or have an Interactive Voice Recognition (IVR) module (not shown in FIG. 2) that instructs the user in addition or instead of a visual menu. The audio instructions may be an enhancement of the video menu. For example, audio processor 230 may generate an audio menu for instructing the user regarding how to participate in the conference and/or how to manipulate the parameters of the conference.

In addition, the MCU 200 may comprise one or more conference on port (COP) components 250. Each COP 250 may be allocated for a session, for example. A COP 250 may receive, process, and send compressed video streams. In one embodiment each COP 250 may comprise a plurality of decoders 251. Each decoder 251 may be associated to an endpoint 130 that is taking part in the videoconference session.

Each decoder 251 may fetch a compressed input video stream received from its associated endpoint 130 via NI 220 and compressed video link 224. Each decoder 251 may decode the received compressed input video stream and output the decoded video stream toward a frame memory of a plurality of frame memories. A Decoded Video Common Interface (DVCI) 252 may be a shared memory that includes the plurality of frame memories. In one embodiment, each frame memory may be associated with one of the decoders 251. In an alternate embodiment the DVCI 252 can be a conventional bus such as Time division multiplexing (TDM) bus. In such embodiments the frame memories may be located at each decoder 251.

Each COP 250 may further include a CP builder 253. The CP builder 253 may compose a CP video image. The CP video image may comprise input video images received from a plurality of endpoints 130. Each COP 250 may receive instructions from the MC 240, including which decoded video streams to include in the CP video image; the order in which to compose the decoded input video streams in the CP video image, the placement of the decoded input video streams in the CP video image, etc.

One embodiment of a CP builder 253 may fetch, according to the MC 240 instructions, a plurality of decoded input frames from one or more frame memories via the DVCI 252. The CP builder 253 scales and/or crops each decoded frame to the size of a segment in the CP image that is associated with the endpoint 130 from which the decoded frame was received, places the scaled and/or cropped frame in the relevant segment of the CP video image, and continues to the next segment in the CP image until completing an entire frame of the CP video image. The completed CP video image frame may be forwarded to an encoder 255. The encoder 255 may compress and/or encode the video CP video image into a compressed stream. The compressed encoded CP video image stream may be output toward a Compressed Video Common Interface (CVCI) 256. The CVCI 256 may include any of a variety of interfaces, including shared memory, an ATM bus, a TDM bus, a switching and direct connection, etc. Video compression is described in more detail in the ITU compression standards H.261, H.263, and H.264, for example, the content of each of which is incorporated herein by reference in its entirety for all purposes.

CP builder 253 may further include a menu generator and a background generator (not shown in the drawings). The menu generator and background generator may generate and/or add text, background segments, etc. before encoding.

The composed compressed output video streams may be obtained by the NI 220 via the video link 224 from the CVCI 256, for example. In some embodiments, the CVCI 256 may be part of the compressed video link 224. The NI 220 may transfer the one or more composed compressed output video streams to the relevant one or more endpoints 130.

In addition to conventional operations of a typical MCU, the MCU 200 may be capable of additional functionality as result of having the MC 240 and a Self Image Controller (SIC) 242. The MC 240 may control the operation of the MCU 200 and the operation of its internal modules, including the audio processor 230, the NI 220, the COP 250, etc.

The MC 240 may process instructions received from a plurality of internal modules of the MCU 200 as well as from external devices, including load balancers, EPs 130, etc. Status and control information may be sent via a control bus 246 and via NI 220 toward network 110 and toward EPs 130 for example. In the other direction status and control information may be sent from EP 130 via network 110 toward the NI 220 and from there toward the MC 240 via the control bus 246. The MC 240 may process signaling and control signals as well as status information received from the audio processor 230 via the control link 244, from the NI 220 via the control line 246, and from one or more COP 250 via a control link 248. The signaling and control signals may be used for conventional operation of an MCU and will not be further described. Other signaling and control signals may be used for controlling unique operations of the MC 240 are described in more details below.

In some embodiments the SIC 242 may be capable of allocating an ID for an EIM of an endpoint. In other embodiments the SIC 242 may inform an endpoint 130 of which location in the CP video image the endpoint 130's self image is embedded. In one embodiment, the location may be given in W×H coordinates in pixels of the top left point and the bottom right point of the segment associated to that endpoint 130. This information can be sent toward the endpoint via the NI 220. In other embodiments, the SIC 242 may instruct the NI 220 which segment of a CP video image sent toward an endpoint 130 to replace. In such embodiments, the instructions can refer to relevant NAL data received from the encoder 255.

In one embodiment, the NI 220 may get instructions from the SIC 242 via link 246, including removing certain NALs from a certain composed compressed output video streams, transferring control information to a certain endpoint 130 regarding a certain composed compressed output video stream, etc. The control information may be the placement in the CP image of a segment containing the image of the endpoint receiving the information, for example. The removal of certain NALs from a certain composed compressed output video streams may remove the NALs containing the image of the endpoint receiving CP video stream, for example.

In some embodiments, the NI 220 may be adapted to communicate with the endpoints 130 regarding a plurality of parameters of the self image, including the location of self image segments in the CP video image, etc. In other embodiments, the NI 220 may be adapted to replace the NALs of the endpoint 130 to which it is delivered In such embodiments, the MCU may be adapted to arrange the NALs of a CP video image so that each NAL includes video data from a single endpoint. A reader who wishes to learn more about arranging CP video included in NALs is invited to read U.S. patent application Ser. No. 12/492,797, the content of which is incorporated herein by reference in its entirety for all purposes.

Some embodiments may operate with a standard MCU 120, for which the EIM are transparent. In such embodiments, the endpoint 130 may handle the entire technique for identifying the EIM and replacing the self image. In such embodiments, there is no need for an SIC 242.

Figure 3A:
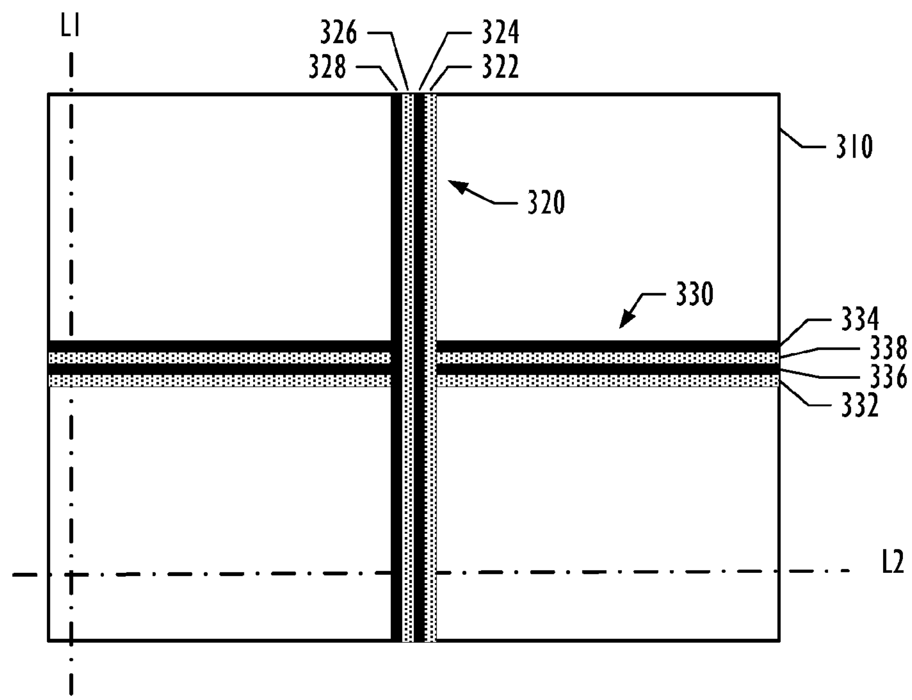
FIG. 3A is a snapshot of a CP video image according to one embodiment in a CP videoconferencing session that includes an endpoint image with EIM.

FIG. 3A is a snapshot illustrating an endpoint image 310 with EIM according to one embodiment. The EIM may comprise two perpendicular coded lines 320 and 330 in the center of the image 310. The coded line 320 may comprise four binary lines 322, 324, 326, and 328, for example. The four binary lines 322, 324, 326, and 328 may represent a binary code. In one embodiment, binary lines 322 and 326 may be bright-colored lines representing a binary zero and binary lines 324 and 328 may be dark-colored lines representing a binary one. Thus, coded line 320 may represent a binary value 1010. The coded line 330 may comprise four similar binary lines. Although referred to herein as invisible, the EIM may be visible in some embodiments.

The binary code of coded lines 320 and 330 may reflect the ID of the endpoint 130 that sent the image, for example. The ID can be represented by an EIM. In some embodiments, in which the MCU 120 is a conventional MCU 120, each participating endpoint may select the type/number of the EIM that it will use to identify its own video image in a received CP video image. The selection may be made by selecting a pseudo-random number, for example. Embedding the EIM in the video image that will be sent by the endpoint to the MCU 120 may be done by the endpoint 130 independently of the other endpoints 130 and the MCU 120.

In one embodiment, the search for the existence of the embedded EIM in a received CP video image may be done by the endpoint in a pre-defined time window after the endpoint 130 transmits the video image with the EIM to the MCU 120. In some embodiments, in which the MCU 120 is adapted to manage the allocation of the EIM, the MCU 120 may manage a table with a plurality of ID numbers and allocate a different ID to each participating endpoint 130. Other techniques for assigning an ID to an endpoint 130 may be used.

In some embodiments, the EIM lines 320 and 330 may be embedded in a plurality of locations in the video image sent by a certain endpoint 130. Every pre-defined period, the endpoint 130 may change the location. In some embodiments, the colors of the binary lines may be selected to match the image colors. The EIM may represent the endpoint ID by other techniques than the use of color. Other EIM ID techniques may represent the endpoint ID by the angle between the coded lines 320 and 330, for example.

The video image 310 sent by the endpoint may be modified by the MCU 120. In one embodiment, the modification may be the cropping of the video image. Dotted lines L1 and L2 in FIG. 3A represent exemplary cropping lines before cropping. Usually the cropping is done to the edges of the video image, thus the EIM is preferably located away from the edges of the video image.

The width of each binary line 322, 324, 326, and 328 may be a pre-defined number of pixels. The width of coded lines 320 and 330 in a CP image may be affected by the scaling decided by an MCU 120. Therefore, the width of each binary line may include a configurable number of pixels that enables scaling down of the image to the size of the segment in the CP image. In some embodiments, the feature of removing a self image can be implemented for layouts of up to 9 segments. In such embodiments, the width of each binary line 322, 324, 325, 328, 332, 334, 336, and 338 may be 6 pixels each.

A plurality of methods may be used to identify the code lines even if they have been altered (due to scaling, for example). A technique according to one embodiment uses a plurality of searching strings, each of which may be adapted to a different number of pixels in each binary line. Consequently each string can point to a binary line for a certain scaling factor. Some embodiments may allow removal of the self image only for CP images up to a pre-defined maximum number of segments, for example, 7, 9, or 16 segments, because when a large number of segment are presented in a CP image, each segment is small, and therefore a small self image is less disturbing and there is less need to remove it.

Figure 3B:
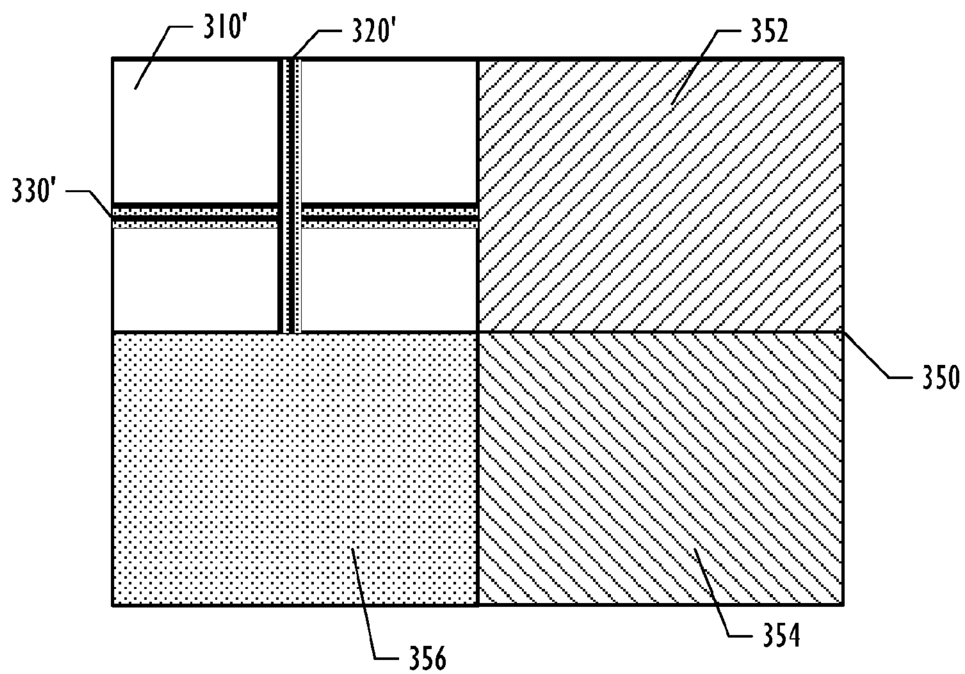
FIG. 3B is a snapshot of an endpoint received CP video image with EIM, according to one embodiment.

FIG. 3B is a snapshot according to one embodiment, illustrating a received CP video image 350 of a conference on port session having a 2×2 layout having 4 segments 310', 352, 354, and 356. The video image at the top left segment 310' includes EIM. In the exemplary embodiment, the top end pixels of the cropped and scaled EIM line 320' define the edge of the top edge of the segment. The low end of the cropped and scaled EIM line 320' defines the low edge of the segment. The left end of the cropped and scaled EIM line 330' defines the left edge of the segment. The right end of the cropped and scaled EIM line 330' defines the right edge of the segment. In an alternate embodiment the MCU 120 may send information to the endpoint 130 regarding the place of the user's self image in the CP image and its size. The snapshot 350 is received by a plurality of the endpoints 130 that participate in this conference on port session.

Upon receiving the snapshot 350, the endpoint 130 that sent the image 310' starts searching the received CP video image 350 looking for the edges of the EIM that the endpoint 130 embedded in the original video image that had been generated by its video camera. Upon identifying the edges of the EIM 320' and 330', the endpoint 130 can define the borders of the segment 310' in which the endpoint 130's self image is embedded and replace the identified self image segment with a replaceable image. Replacement images may include a background, another video image sent from an MCU 120, a stored video image for such cases, etc.

Figure 4:
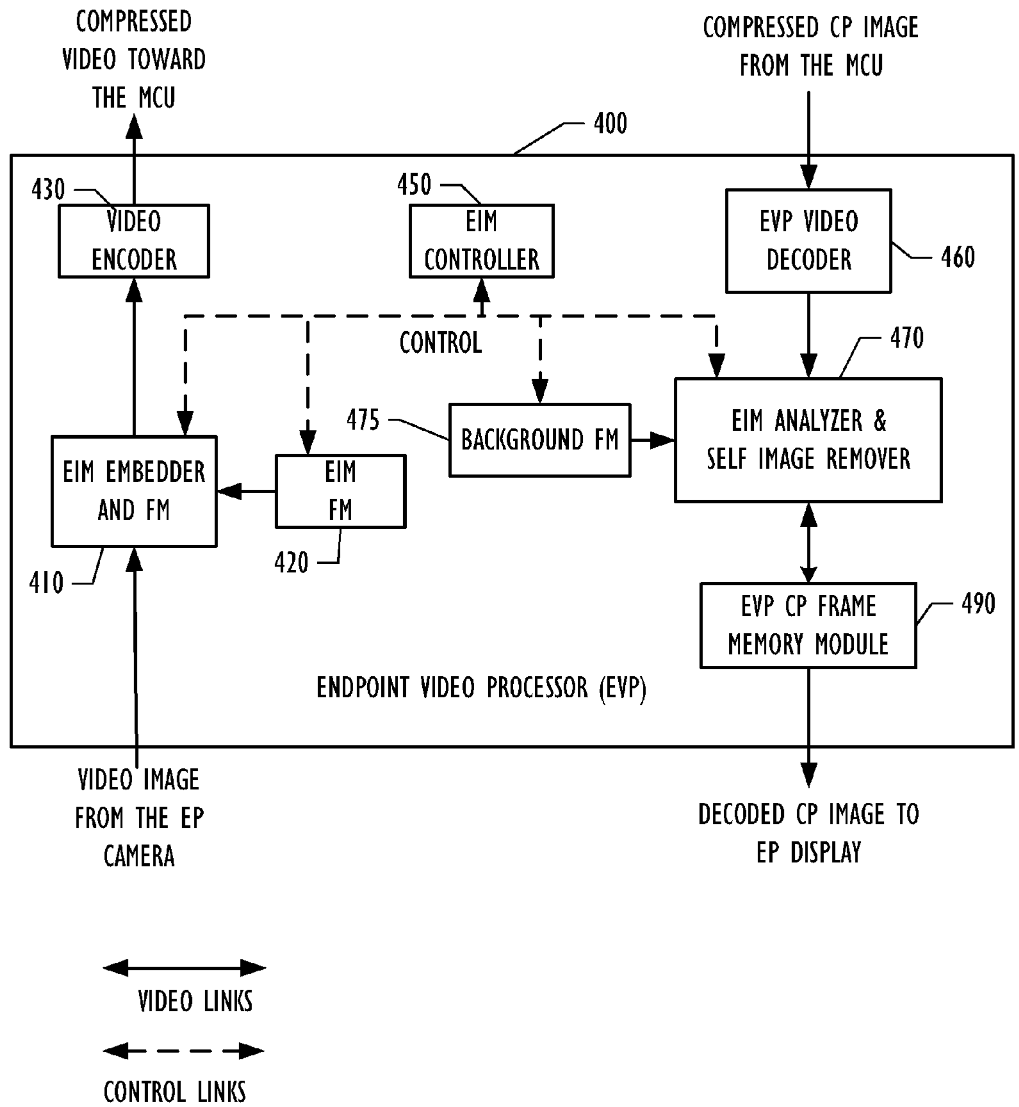
FIG. 4 is a block diagram illustrating relevant elements of a portion of an endpoint video processor (EVP), according to one embodiment.

FIG. 4 is a block diagram with relevant elements of a portion of an Endpoint Video Processor (EVP) 400 according to one embodiment. The EVP 400 may be placed in or associated with the endpoint 130 itself. The EVP 400 may get a video image of the endpoint 130 from the EP 130's camera. The video image may be processed/modified by an EIM Embedder and Frame Memory (EEFM) 410. The processing/modification may comprise adding EIM to a pre-defined number of frames of video images, for example.

The EEFM 410 may receive commands from an EIM controller 450, such as commands to add EIM to the next 5 frames. The EIM may comprise a few binary coded lines, as described above. In some embodiments, the EEFM 410 may produce the EIM data. In alternate embodiments, an EIM Frame Memory 420 may produce a frame in which most of the frames are transparent and only the pixels along the EIM lines have the value of the EIM pixels. In one embodiment, instructions regarding the combination of the EIM data and the location of the vertical and horizontal line of the EIM may be given by the EIM controller 450. In alternate embodiments the data and the location of EIM strings may be fixed.

The EEFM 410 may forward the processed video image with the EIM coded lines toward a video encoder 430. The video encoder 430 may encode the video image and output the compressed video image toward an MCU 120.

The EVP 400 may also get a compressed CP image from an MCU 120. The compressed CP image may be decoded by an EVP video decoder 460. The decoded CP image may be forwarded toward an EIM Analyzer and Self Image Remover (EASIR) 470. The EASIR 470 may analyze the CP image and search for the EIM, which were embedded by its associated EEFM 410. The EASIR 470 may receive instructions from the EIM controller 450, including instructions regarding the type of EIM to search and when to search.

The EASIR 470 may use multiple searching techniques. In one embodiment, the EASIR 470 may use a group of match filters. Each match filter can match the data of an EIM coded line 320 or 330 as it scaled in order to be placed in a segment of a layout. Each match filter can be adapted to different scale factor. For example, in an embodiment where each EIM line 322-328 has 12 pixels, the EASIR 470 may have 6 match filters: (1) a match filter having 48 pixels (12 per each line, for scale factor 1), (2) a match filter having 40 pixels (10 per each line, for scale factor ⅚), (3) a match filter having 36 pixels (9 per each line, for scale factor ¾), (4) a match filter having 24 pixels (6 per each line, for scale factor ½), (5) a match filter having 16 pixels (4 per each line, for scale factor ⅓), and (6) a match filter having 12 pixels (3 per each line, for scale factor ¼).

An EASIR 470 according to one embodiment may be configured to scan or slide over a decoded frame of a received CP video image with the plurality of match filters looking for a segment that includes the EIM lines. Upon identifying the segment having the self image, a background segment can be fetched from a background FM 475 and used to replace the segment having the self image. The background FM may have a set of few frames, 4-6 frames for example. Each frame in the set may be in a plurality of segment sizes. Example sizes may include ¼ of a frame, ⅙ of a frame, ¾ of a frame, etc. Background frame memory 475 may store multiple video images, including still backgrounds, logo, etc. In another embodiment, the background frame memory 475 is not used; instead, the EASIR 470 may be configured to replace the video data of each pixel in the found segment with a background color. In some embodiments, the match filters may be adapted to overcome the affects of the encoders and decoders of the endpoint 130 and the MCU 120 on the EIM. In one embodiment, after assigning an EIM to an endpoint 130, before starting the transmission of its video and audio toward the MCU 120, the endpoint 130 may transfer a set of EIM frames via an encoding/decoding/encoding/decoding cycle and then adapt the match filters to the set of EIM frames after completing this cycle.

The EIM controller 450 may instruct, from time to time, the EEFM 410 to embed the EIM in a certain location. After a pre-defined time the EIM controller 450 may instruct the EASIR 470 to search for the embedded EIM in the received CP video images. The decision when to embed EIM may be based on a plurality of parameters, including identified changes in a received CP image, received information from the SIC 242 on a change in a CP image, a periodical check, etc. Identification of a change in a CP image may be performed according to the mixed audio received from the MCU, for example.

The EASIR 470 may forward the processed CP image to an EVP CP Frame Memory module 490. If a segment with a self image was found in a decoded received CP video image, then the processed CP image may include the decoded received CP video image with a background or other replacement segment instead of the self image segment. If a self image was not detected, then the processed image can be similar to the decoded received CP video image. The EVP CP Frame Memory module 490 may output the CP image video toward the screen of the endpoint 130.

Figure 5:
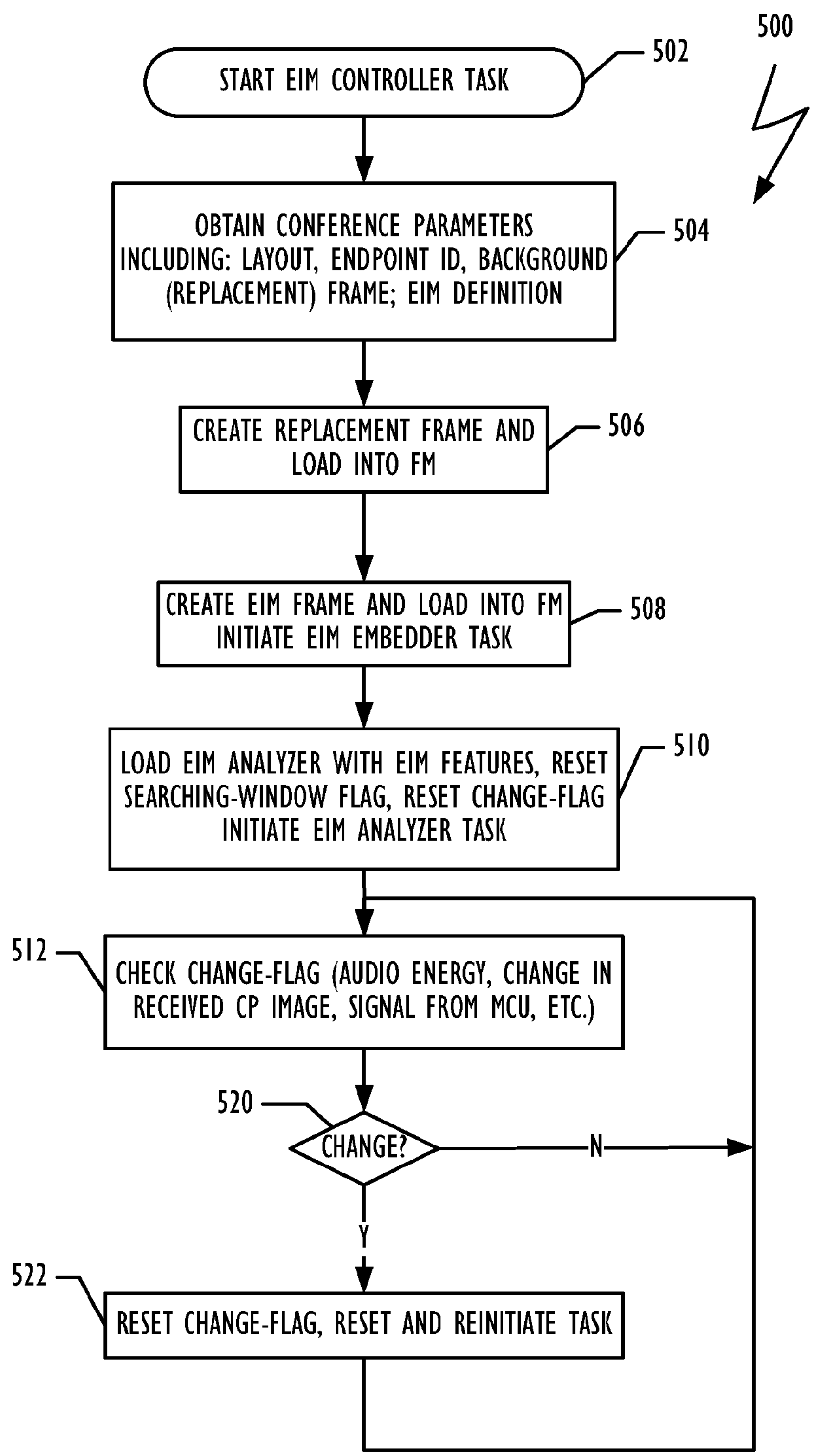
FIG. 5 is a flowchart illustrating relevant acts of an EIM controller technique, according to one embodiment.

FIG. 5 is a flowchart illustrating relevant actions of an EIM Controller task technique 500. Technique 500 may be executed beginning in block 502 by the EIM controller 450. In block 504, a plurality of conference parameters may be obtained, including information on the layout, given endpoint ID, information on a background (replacement) frame, EIM definition, etc. The conference parameters may be given by an MCU 120. Some of the parameters may be obtained only when the MCU 120 is adapted to be involved in a process of removing a self image by an endpoint 130. Such parameters may include an endpoint ID, a background (replacement) frame, an EIM definition, etc.

A set of replacement background segments may be created in block 506 and loaded into a background frame memory 475. An EIM frame may be created in block 508 and loaded into the EIM frame memory 420. An EIM embedder task may also be initiated in block 508. More information on the embedder task technique 500 is disclosed below in conjunction with FIG. 6. Next, the EASIR 470 may be loaded in block 510 with information regarding EIM features. The information may include a set of one or more match filters for searching the EIM in a CP video image. The EIM Controller task technique may also reset some flags, including in one embodiment a Searching Window flag and a Change flag. An EIM Analyzer task may be initiated in block 510. More information about the EIM Analyzer task is disclosed below in conjunction with FIGS. 7A and 7B.

Next, a loop may begin. The Change flag may be examined in block 512. The Change flag may be set based on a plurality of indications, including in some embodiments a change in the energy of the received conference mix audio, a change in received CP image, a signal from the MCU, a received Intra frame etc. Based on the value of the Change flag, a decision is made in block 520 whether a change has been made. If not, then block 512 may be repeated. If a change has been made, then the EIM Controller task technique 500 may proceed to block 522.

At block 522, the Change flag may be reset, as well as the EIM embedder task, which is reinitiated in block 522. Next, EIM Controller task technique 500 may return to block 512.

Figure 6:
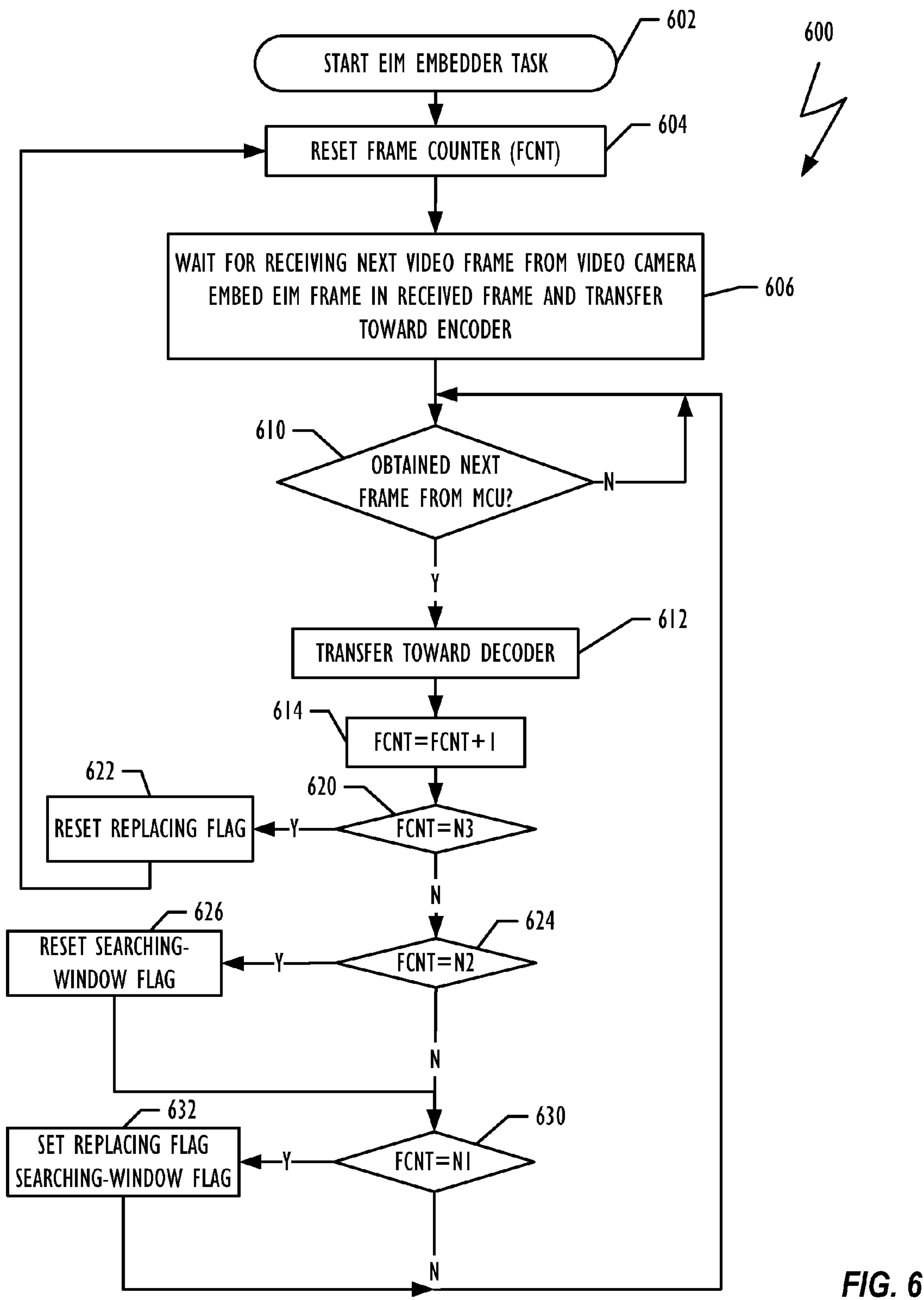
FIG. 6 is a flowchart illustrating relevant acts of an EIM embedder technique, according to one embodiment.

FIG. 6 is a flowchart illustrating relevant acts of an EIM embedder task 600. Task 600 may be implemented by an EEFM 410 in some embodiments. In other embodiments, task 600 may be implemented by the EIM controller 450. EIM 450 may instruct the rest of the components of the endpoint (EEFM 410, EIM Frame Memory 420, EIM-Analyzer-and-Self-image Remover 470, etc.) This task can be initiated in block 602 by the EIM controller 450 during the beginning of a conference, as described above. In addition, task 600 can be started again from block 602 each time the EIM controller determine that a change in the received CP video image has occurred, as is described above. A plurality of flags and counters may be reset 604, including a Replacing flag that may indicate whether a segment needs to be replaced and Frame counters (FCnts).

Next task 600 may wait in block 606 for a next video frame to be received from a video camera of the endpoint 130, for example. Once the frame is received, an EIM frame is embedded in the received frame. In some embodiments, block 606 may also include changing the type of the EIM, including changes in color, changes in location, size, etc. Those changes may be implemented in order to reduce the probability that a conferee may be bothered by the appearance of the EIM over a receiving CP video image. Those changes do not affect the detection of the EIM by the sending EP 130 because the sending endpoint 130 knows when the frame was sent, in which location, and in which color code, for example.

The modified frame with the embedded EIM may then be transferred toward an encoder 430. From then on, the handling of the modified frame is the conventional handling of a video frame in an endpoint 130 without the involvement of the EEFM 410. The encoder 430 compresses the video data with the EIM as a conventional frame and sends the compressed video toward the MCU 120.

Task 600 starts a controlling loop from block 610 to block 632. The controlling loop can be used for controlling the timing of when to start and stop looking for the EIM in receiving CP video image, when to start and end the replacing of the self image, etc. At block 610, a decision is made whether a next CP video frame has been obtained from an MCU 120. If not, then task 600 waits in block 610. Once a next frame is obtained, then method 600 may proceed to block 612.

The received frame from the MCU 120 is transferred in block 612 toward a decoder 460. The FCnt value may be incremented in block 614 and a decision needs to be made in block 620 whether the FCnt value equals N3. In one embodiment, the value of N3 may be in the range 10-100, inclusive. The value of N3 may be pre-defined or adapted to the session. For example, in dynamic sessions, the value of N3 may be smaller, in the range 10-20, and in a static session it may be larger, in the range 80-100. In some cases, N3 may be similar to the rate of changing a presented conferee in a layout. If in block 620 the FCnt value equals N3, then Replacing flag may be reset in block 622 and task 600 may return to block 604 for rechecking if the endpoint is a presented endpoint.

If in block 620 the FCnt value does not equal N3, then task 600 may proceed to block 624, where the FCnt value is compared to N2. The value of N2 may be in the range 5-8, inclusive, for example. The N2 value is typically smaller then the N3 value. The N2 value may be a pre-defined value that in one embodiment may reflect a maximum delay between an endpoint 130 sending a video image and the same endpoint 130 receiving a CP image that includes the sending self image plus few frames (1-3, for example) in order to be sure that the probability to receive the modified frame of the self image with the EIM is very small. If the FCnt value equals N2 then a Searching Window flag may be reset in block 626 indicating the EASIR 470 should stop searching for EIM in the following received CP video images. Next, task 600 may proceed to block 630. If the FCnt value does not equal N2, then task 600 may proceed directly to block 630.

In block 630, the FCnt value is compared to N1. N1 value may be in the range of 2-5, for example. The N1 value is typically smaller than the N2 value. The N1 value may be a pre-defined value or may be adapted according to the delay in the system. The N1 value may reflect the minimum delay between an endpoint 130 sending a video image and the same endpoint 130 receiving a CP image that includes the sending self image, for example. The N1 value may be monitored at the beginning of the session. If the FCnt value equals N1, then the Replacing flag and the Search Window flag are set in block 632 indicating the EASIR 470 should start searching for EIM in the following received CP video images. Task 600 then returns to block 610. If the FCnt value does not equal N1, then task 600 may return to block 610. In some embodiments, an endpoint 130 may be configured to learn the delay, in frames or milliseconds, between transmitting a frame with EIM and receiving a CP video image that includes that frame. Such embodiments may adapt the values of N1 and N2 to the learned delay from the time of transmitting by the endpoint 130 of a frame with EIM and receiving the CP video image with the EIM.

Figure 7A:
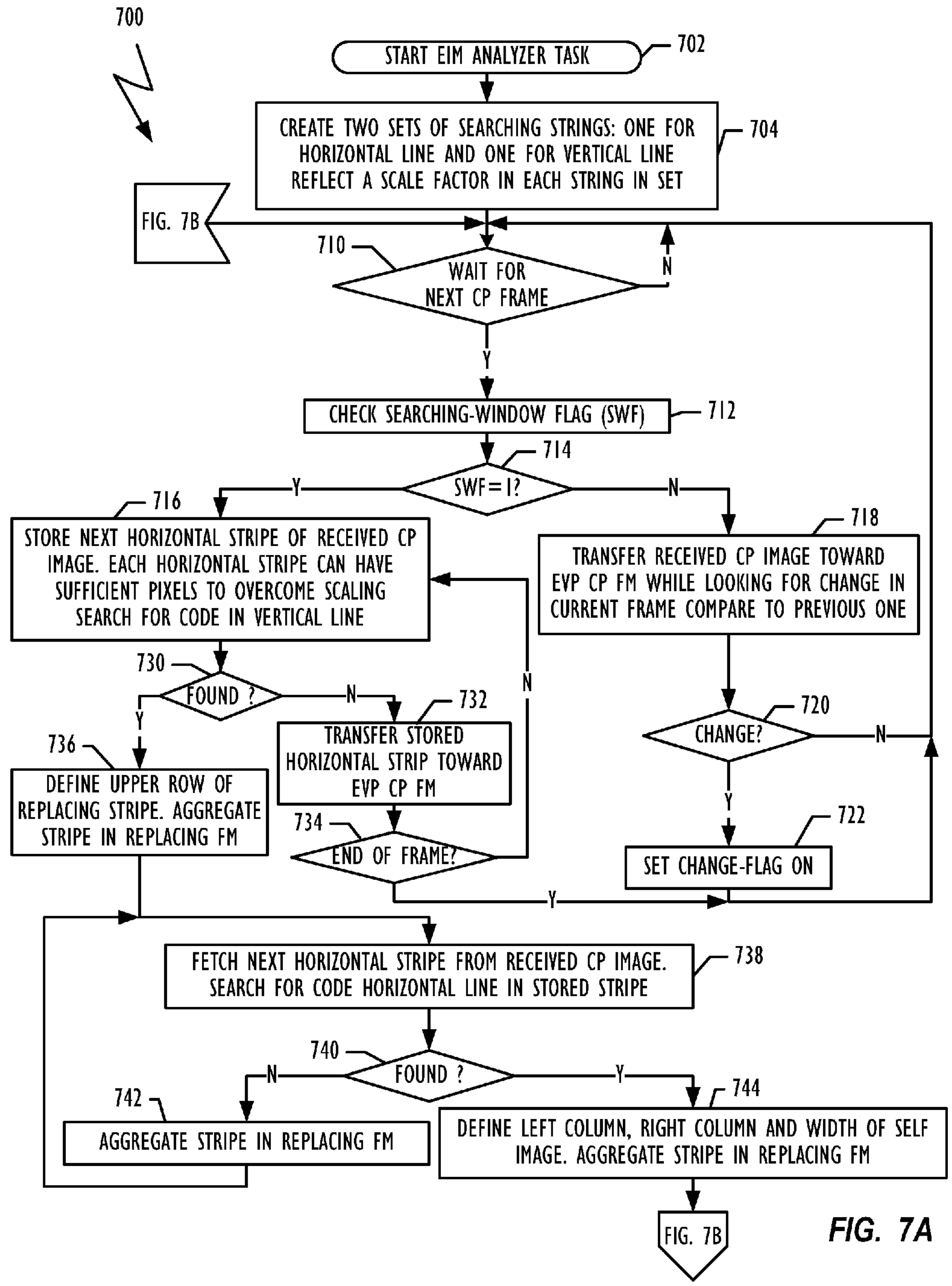
FIGS. 7A and 7B are a flowchart illustrating relevant acts of an EIM analyzer technique, according to one embodiment.
Figure 7B:
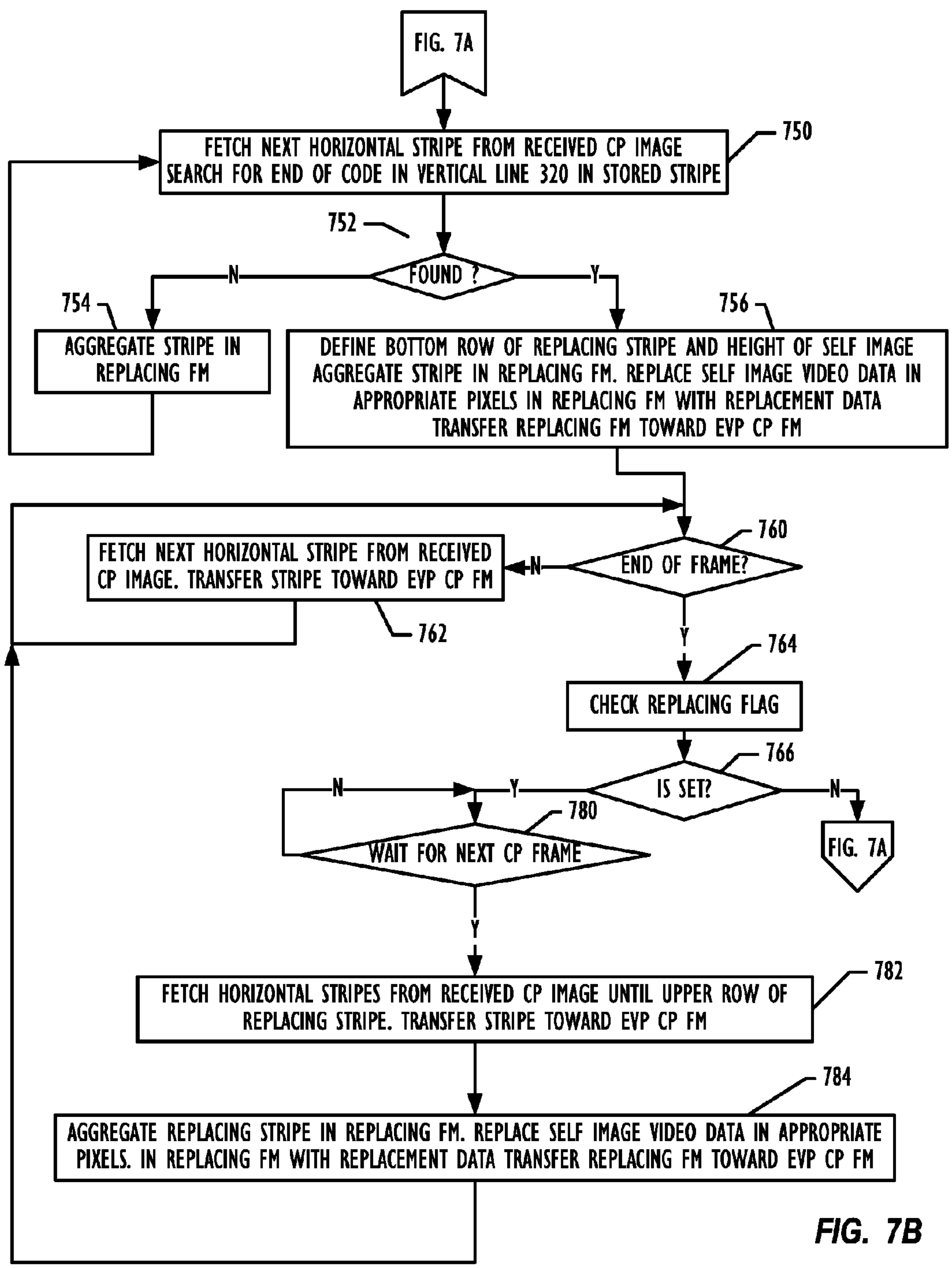

FIGS. 7A and 7B are a flowchart illustrating relevant actions of an exemplary EIM analyzer task technique 700 according to one embodiment. Technique 700 may be implemented in one embodiment by an EASIR 470. This task may be initiated in block 702 during the beginning of a conference by the EIM controller 450, as described above. After initiation, one or more sets of searching strings may be created in block 704. In one embodiment, two sets of searching strings may be created in block 704. One set may be used when searching for horizontal coded lines in a video image, for example coded line 330. The second set may be used when searching for vertical coded lines in a video image, for example coded line 320. An example searching string according to one embodiment is a match filter that is adapted to the shape and color of the EIM that the filter is looking for, taking into consideration a certain scaling factor. Each string in a set may be used for a different scale factor used in popular video sessions. Exemplary scale factors can be 1, ⅓, ½, ¼, ⅔, etc.

After the preparation stage of block 704, technique 700 may wait in block 710 to obtain a next decoded CP video image frame from EVP decoder 460. When a next frame is obtained, the Searching Window flag (SWF) may be examined in block 712, and a decision is made in block 714 whether the flag is set, which in one embodiment is performed by comparing the value of the Searching Window flag to 1. The flag is set in block 632 by the EEFM 410. If the SWF is not set, then technique 700 may proceed to block 718, where the decoded received CP video image frame is transferred toward an Endpoint Video CP Processor Frame Memory 490, and from there the frame is displayed on the display unit of endpoint 130. In addition, technique 700 may search the received decoded video frame in block 718, looking for changes in the current frame compared to a previous frame. In one embodiment, the search for changes may be done by calculating an average and standard deviation values for each color coordinate and each group of pixels. The group of pixels may be the entire frame, 4 horizontal strips of the frame, etc. The value of the calculated average and standard deviation values of each strip may be stored. The calculated values can be compared to the values that were calculated and stored while receiving the previous CP video frame. Next, a decision needs to be made in block 720 whether a change has been identified. If not, then technique 700 may return to block 710. If a change has been identified, then a Change flag may be set in block 722 and technique 700 may return to block 710. In one embodiment, a change can be defined as a pre-defined percentage difference between the current calculated value and the stored one. In one embodiment, a change is recognized if the difference is above 30%. The Change flag may be sampled by the EIM controller 450 as described above.

Returning now to block 714, if the SWF value is equal to 1, then technique 700 may proceed to block 716 and start searching for the EIM in the received decoded CP image frame. In block 716, a next horizontal stripe of the received CP image may be stored. Each horizontal stripe may have sufficient pixels to overcome scaling. A search for a vertical coded line may be made by using the set of filters that are adapted to the vertical coded line 320, for example. Next, a decision is made in block 730, whether a vertical coded line was identified by at least one filter from the set of filters. If not, then the stored horizontal stripe may be forwarded toward the Endpoint Video CP Processor Frame Memory 490 and from there as conventional video to the display of the endpoint. If the end of the frame has been reached as detected in block 734, then technique 700 may return to block 710, to waiting for the next frame. If the end of the frame has not been reached, then technique 700 may return to block 716 and start searching the next stripe. In some embodiments, the searching may be done after getting the entire CP video image frame.

Returning now to block 730, if a vertical coded line 320 has been found, then technique 700 may proceed to block 736, where the upper row of a replacing stripe may be defined. The upper row of the segment that includes the self image is the first row in which the vertical coded 320 is observed. In one embodiment, the definition may be in numbers of lines (rows) from the beginning of the frame. In one embodiment, the stripe may be aggregated in a Replacing Band Memory. A next horizontal stripe then may be fetched in block 738 from the received CP image.

A search for a horizontal coded line in the stored stripe may be made in block 738. A decision is made in block 740 whether the horizontal coded line 330 has been identified. If not, then the horizontal stripe may be aggregated in block 742 in the Replacing Band Memory. Next, technique 700 may return to block 738. If a horizontal coded line has been identified, then technique 700 may proceed to block 744, where the left column, the right column, and the width of the self image may be defined. In one embodiment, the left column is defined by the pixel in which the left edge of the horizontal coded line 330 was found. The right column is defined by the right edge pixel of the found horizontal coded line 330. The interval between the two edges of the found horizontal coded line 330 defines the width of the segment that includes the self image. Then the horizontal stripe may then be aggregated in block 744 in the Replacing Band Memory, and technique 700 may proceed to block 750 of FIG. 7B.

In block 750, a next horizontal stripe may be obtained from the received CP image. A search for the end of the vertical coded line 320 may be made in block 750 in the stored stripe. If the end of the vertical coded line was not identified as determined in block 752, indicating that the stripe includes the segment with the self image, then the horizontal stripe may be aggregated in block 754 in the Replacing Band Memory and technique 700 may return to block 750. If the end of the vertical coded line 320 was identified in block 752, then the bottom row of the vertical coded line 320 indicates the bottom line of the replacing stripe. The height of the self image may be defined in block 756 as the number of rows, lines, between the top edge and the bottom edge of the found vertical coded line 320. The horizontal stripe may be aggregated 756 in the Replacing Band Memory (not shown in the drawings). In an exemplary embodiment of EVP 400, the Replacing Band Memory can be a temporary memory that is associated with the EASIR 470.

Technique 700 may then determine the location of the self image in the replacing stripe. The top left corner of the self image can be defined by the junction of the left edge of the found horizontal coded line 330 and the top edge of the found vertical coded line 320. The width of the self image is the width of the found horizontal coded line 320 and the height is the height of the found vertical coded line 320. At this point, the self image data may be replaced in block 756 with the relevant replacement data from the background frame memory 475 and the replacing frame memory with the background color may be transferred toward Endpoint Video Processor CP Frame Memory 490 and from there to the display unit.

In block 760, a determination is made whether the end of the frame has been reached. If not, then a next horizontal stripe may be fetched in block 762 from the received CP image. The next horizontal stripe may be transferred as is toward the Endpoint Video Processor CP Frame Memory 490 and from there toward the display unit. Technique 700 may then return to block 760 looking for the end of frame. If the end of the frame has been reached in block 760, then the Replacing flag may be examined in block 764. The Replacing flag may be used to indicate whether the replacing window is active and whether the segment that was associated with the self image is to be replaced in the next frame of CP image.

If the Replacing flag is not set, then technique 700 may return to block 710 of FIG. 7A. If the Replacing flag is set, then technique 700 may wait in block 780 for a next CP frame. If in block 782 a next CP frame is obtained, then a horizontal stripe from the beginning of the received CP video image until the upper row of the replacing stripe may be fetched from the decoder and be transferred as is toward Endpoint Video Processor CP Frame Memory 490 and from there to the display unit of the endpoint 130. Next, the replacing horizontal stripe may be aggregated in block 784 in the replacing frame memory. The self image data may be replaced in the appropriate pixels in the replacing frame memory with the replacement data. The modified horizontal stripe is transferred toward the Endpoint Video Processor CP Frame Memory 490 and from there to the display unit of the endpoint 130. Next, technique 700 may return to block 760.

Other exemplary embodiments for removing a self image may be implemented by an MCU 120. In such embodiment, an MCU 120 may manage the self image removal. An MCU 120 according to one embodiment, prior to the beginning of the session, may allocate a temporary ID to each endpoint 130, may define the EIM to each endpoint 130, and inform the endpoint 130 about them. During the conference session, the MCU 120 may inform the type of layout and signal the endpoints 130 each time a change in the presented conferees has been made for triggering the searching process. In some embodiments, the MCU 120 may even inform each presented conferee on the exact location of the self image of each presented conferee in the CP image that is sent toward those conferees. In other embodiments, the technique 700 may be modified to begin after receiving the entire CP video image and not while receiving the CP video image.

The information may be given in the handshake establishment phase of the conference call, for example. In an alternate embodiment, the information may be given during a conference call via certain pre-defined header fields of the RTP header, for example. In the pre-defined header fields, each field may be associated to a certain endpoint, for example.

In the description and claims of the present disclosure, “comprise,” “include,” “have,” and conjugates thereof are used to indicate that the object or objects of the verb are not necessarily a complete listing of members, components, elements, or parts of the subject or subjects of the verb.

It will be appreciated that the above-described apparatus, systems and methods may be varied in many ways, including, changing the order of actions, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments along the discloser. The scope of the invention is limited only by the following claims and equivalents thereof.

While certain embodiments have been described in detail and shown in the accompanying drawings, it is to be understood that such embodiments are merely illustrative of and not devised without departing from the basic scope of the present invention, which is determined by the claims that follow.

We claim:

1. A method that identifies a self image embedded in a continuous presence video image frame, comprising:
identifying an embedded marker in the continuous presence video image frame; and
calculating a location of the self image in the continuous presence video image frame responsive to the embedded marker.

2. The method of claim 1, wherein the embedded marker comprises a coded vertical line and a coded horizontal line.

3. The method of claim 1, wherein the embedded marker comprises an identification of an endpoint that created the embedded marker.

4. The method of claim 1, wherein the act of identifying an embedded marker in the continuous presence video image frame and the act of calculating a location of the self image in the continuous presence video image frame are performed by an endpoint that created the self image.

5. The method of claim 1, wherein the act of calculating a location of the self image in the continuous presence video image frame comprises:
identifying ends of the embedded marker; and
calculating the location of the self image using the ends of the embedded marker.

6. The method of claim 1, further comprising replacing the self image in the continuous presence video image frame with other video data.

7. The method of claim 1, further comprising replacing the self image in the continuous presence video image frame with a background color.

8. The method of claim 1, further comprising:
embedding the embedded marker at a multipoint control unit in a video image frame corresponding to an endpoint.

9. The method of claim 1, further comprising:
embedding the embedded marker at an endpoint,
wherein the act of identifying an embedded marker in the continuous presence video image frame is performed a pre-determined time after performing the act of embedding the embedded marker at the endpoint.

10. The method of claim 1, further comprising:
embedding the embedded marker at an endpoint, responsive to a change in the continuous presence video image received by the endpoint.

11. A method that removes a self image from a continuous presence video image, comprising:
calculating a location of the self image in the continuous presence video image, comprising:
identifying an embedded marker in the continuous presence video image; and
calculating the location of the self image in the continuous presence video image responsive to the embedded marker; and
replacing the self image in the continuous presence video image with other video data.

12. The method of claim 11, wherein the embedded marker comprises a coded vertical line and a coded horizontal line.

13. The method of claim 11, wherein the act of calculating the location of the self image in the continuous presence video image comprises:
identifying ends of the embedded marker; and
calculating the location of the self image from the ends of the embedded marker.

14. The method of claim 11, wherein the act of replacing the self image in the continuous presence video image with other video data comprises:
replacing the self image in the continuous presence video image with a background color.

15. The method of claim 11, wherein the act of calculating a location of a self image in the continuous presence video image is performed responsive to information received from a multipoint control unit that controls a corresponding continuous presence video conference.

16. An apparatus that identifies a self image of an endpoint that participates in a continuous presence video conference, comprising:
an embedded marker embedder, that embeds an embedded marker in a video image associated with the endpoint, and sends the video image with the embedded marker toward a multipoint control unit that controls the continuous presence video conference; and
an embedded marker identifier, that identifies the embedded marker in a continuous presence video image and calculates a location of the self image in the continuous presence video image.

17. The apparatus of claim 16, further comprising:
a self image remover, that replaces the self image located by the embedded marker identifier with other video data.

18. The apparatus of claim 17, wherein the other video data is a background color.

19. The apparatus of claim 17, wherein the other video data is a video image associated with another endpoint that participates in the continuous presence video conference.

20. The apparatus of claim 19, wherein the embedded marker identifies the endpoint that generated the self image.

* * * * *